US010618492B2

(12) United States Patent
Aranzulla et al.

(10) Patent No.: US 10,618,492 B2
(45) Date of Patent: Apr. 14, 2020

(54) INFLATABLE AIRBAG FOR PROTECTING A PERSON, AND AIRBAG MODULE, VEHICLE PARTS AND VEHICLE OCCUPANT RESTRAINT SYSTEM HAVING SUCH AN AIRBAG

(71) Applicant: TRW AUTOMOTIVE GMBH, Alfdorf (DE)

(72) Inventors: Daniele Aranzulla, Essingen (DE); Achim Hofmann, Tüssling (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 15/304,890

(22) PCT Filed: Apr. 30, 2015

(86) PCT No.: PCT/EP2015/000896
§ 371 (c)(1),
(2) Date: Oct. 18, 2016

(87) PCT Pub. No.: WO2015/165592
PCT Pub. Date: Nov. 5, 2015

(65) Prior Publication Data
US 2017/0174170 A1 Jun. 22, 2017

(30) Foreign Application Priority Data
Apr. 30, 2014 (DE) .................... 20 2014 003 584 U

(51) Int. Cl.
*B60R 21/203* (2006.01)
*B60R 21/205* (2011.01)
(Continued)

(52) U.S. Cl.
CPC .......... *B60R 21/231* (2013.01); *A42B 3/0486* (2013.01); *B60R 21/203* (2013.01);
(Continued)

(58) Field of Classification Search
CPC ... B60R 21/231; B60R 21/203; B60R 21/205; B60R 21/207; B60R 21/21; B60R 21/213; B60R 21/23138; B60R 2021/2074
See application file for complete search history.

(56) References Cited

U.S. PATENT DOCUMENTS 6,308,983 B1 * 10/2001 Sinnhuber ............. B60R 21/233
280/735
6,971,665 B2 * 12/2005 Tanaka .................. B60R 21/232
280/729
(Continued)

FOREIGN PATENT DOCUMENTS

DE       19950768 A1 *  4/2001  ............ B60R 21/20
DE     102010016716       5/2011
(Continued)

Primary Examiner — Faye M Fleming
(74) Attorney, Agent, or Firm — Tarolli, Sundheim, Covell & Tummino LLP

(57) ABSTRACT

The invention relates to an inflatable airbag (1) for the protection of a person comprising a flexible sheath (10) which comprises at least two fingerlike extensions (11), wherein the flexible sheath (10) delimits a closed gas expansion chamber by the fingerlike extensions (11). The invention excels by the fact that the fingerlike extensions (11) are connected by at least one of being stitched, glued or welded to each other so that in an inflated state the airbag (1) takes a three-dimensional shape. The invention further relates to an airbag module, a vehicle occupant restraint system as well as vehicle parts comprising such airbag.

23 Claims, 6 Drawing Sheets

(51) Int. Cl.
*B60R 21/21* (2011.01)
*B60R 21/207* (2006.01)
*B60R 21/231* (2011.01)
*A42B 3/04* (2006.01)
*B60R 21/2334* (2011.01)
*B60R 21/235* (2006.01)
*B60R 21/233* (2006.01)

(52) U.S. Cl.
CPC .......... *B60R 21/205* (2013.01); *B60R 21/207* (2013.01); *B60R 21/21* (2013.01); *B60R 21/235* (2013.01); *B60R 21/2334* (2013.01); *B60R 21/23138* (2013.01); *B60R 2021/2078* (2013.01); *B60R 2021/23153* (2013.01); *B60R 2021/23308* (2013.01); *B60R 2021/23542* (2013.01); *B60R 2021/23571* (2013.01)

(56) References Cited

U.S. PATENT DOCUMENTS

| | | | | |
|---|---|---|---|---|
| 7,029,030 B2* | 4/2006 | Amamori | ............... | B60R 21/23 280/730.1 |
| 7,040,651 B2* | 5/2006 | Bossecker | ......... | B60R 21/23138 280/729 |
| 7,780,188 B2* | 8/2010 | Eckert | .................... | B60R 21/20 280/728.2 |
| 9,296,359 B2* | 3/2016 | Pan | ...................... | B60R 21/233 |
| 2002/0149187 A1* | 10/2002 | Holtz | ................... | B60R 21/206 280/749 |
| 2010/0007124 A1 | 1/2010 | Fischer et al. | | |
| 2010/0140909 A1 | 6/2010 | Jang | | |
| 2011/0095512 A1 | 4/2011 | Mendez | | |
| 2013/0088056 A1* | 4/2013 | Quatanens | ........... | B60R 21/233 297/216.13 |
| 2013/0276213 A1* | 10/2013 | Olsson | ................. | A42B 3/0486 2/413 |
| 2014/0327234 A1* | 11/2014 | Heurlin | ................ | B60R 21/207 280/730.1 |
| 2015/0203066 A1 | 7/2015 | Pausch et al. | | |
| 2017/0136981 A1* | 5/2017 | Fukawatase | ......... | B60R 21/233 |

FOREIGN PATENT DOCUMENTS

| | | | | |
|---|---|---|---|---|
| DE | 102015008455 A1 * | 1/2017 | ........... | B60R 21/233 |
| JP | 10272193 A * | 10/1998 | ............. | A62B 37/00 |
| JP | 2015058908 A * | 3/2015 | .......... | B60R 21/207 |
| JP | 2016222073 A * | 12/2016 | | |

* cited by examiner

INFLATABLE AIRBAG FOR PROTECTING A PERSON, AND AIRBAG MODULE, VEHICLE PARTS AND VEHICLE OCCUPANT RESTRAINT SYSTEM HAVING SUCH AN AIRBAG

RELATED APPLICATIONS

This application corresponds to PCT/EP2015/000896, filed Apr. 30, 2015, which claims the benefit of German Application No. 20 2014 003 584.9, filed Apr. 30, 2014, the subject matter of which are incorporated herein by reference in their entirety.

BACKGROUND OF THE INVENTION

The invention relates to an inflatable airbag for the protection of a person in accordance with the preamble of claim 1. Furthermore, the invention relates to an airbag module as well as vehicle parts, especially a steering wheel, an instrument panel, a rear seat or a rear seat bench, a window frame or a roof liner as well as a piece of garment comprising such airbag. Finally a vehicle occupant restraint system comprising an airbag or an airbag module is indicated within the scope of the invention.

An airbag of the afore-mentioned type is known from WO 2012/044245 A1, for example. The known airbag is part of a protection device for a person's head including the airbag and an outer sheath. The airbag comprises a flexible sheath including fingerlike extensions which delimits a closed gas expansion chamber, and is embedded in an outer bag made of gas-tight material, with the individual fingers of the sheath engaging in receiving pouches of the outer bag. It is provided that the outer bag predetermines the shape of the protection device in the inflated state of the airbag. In other words, the outer bag delimits the expansion of the inner airbag, especially the fingerlike extensions of the inner airbag. This ensures that the protection device takes the desired shape in the inflated state. In the known protection device this shape is especially in the form of a bicycle helmet so that the inflated airbag encloses the person's head of the in a helmet-like manner.

It is a drawback in the known protection device that a relatively high effort has to be made for manufacturing the inner airbag and the outer bag. The functional separation of the inflatable airbag and the shaping outer bag results in a relatively complicated configuration of the protection device and increases the production effort. Finally this results in increased manufacturing costs.

From practice alternative ways of shaping airbags are known. In particular, tethers which tension upon inflation of the airbag and thus delimit the widening or expansion of the airbag may be integrated in the airbag. Tethers of this type may be arranged both inside the airbag and outside the airbag. For example, DE 10 2012 213 284 A1 illustrates an airbag having external tethers which urge the airbag in the inflated state into a three-dimensional shape. These solutions with tethers require additional stitching work and individual parts so that the structure of such airbags is complicated and results in increased production costs.

SUMMARY OF THE INVENTION

It is the object of the invention to state an inflatable airbag for the protection of a person which has a simple structure and can be produced at low manufacturing costs. It is a further object of the invention to state an airbag module, a vehicle occupant restraint system as well as vehicle parts comprising said airbag.

In accordance with the invention, this object is achieved with respect to the airbag by the subject matter of claim 1, with respect to the airbag module it is achieved by the subject matter of claim 13, with respect to the vehicle occupant restraint system it is achieved by the subject matter of claim 15 and with respect to the vehicle parts it is achieved by the subject matters of the claims 16 to 21.

Hence the invention is based on the idea to provide an inflatable airbag for the protection of a person comprising a flexible sheath which includes at least two fingerlike extensions. The flexible sheath delimits by the fingerlike extensions a closed gas expansion chamber. In accordance with the invention, the fingerlike extensions are connected, especially stitched, glued or welded, to each other so that in the inflated state the airbag takes a three-dimensional shape.

Consequently, in the invention the separation between the expansion function of the airbag and the shaping function known from the state of the art is combined in one component. This reduces the total number of components required for a protection device for the protection of a person, especially in road traffic. In the manufacturing state the fingerlike extensions of the flexible sheath are preferably spaced apart from each other at least in portions. By interconnecting the fingerlike extensions, gaps between the fingerilke extensions are closed and the sheath and, resp., the airbag is thus urged into a three-dimensional shape. Depending on the shape of the individual fingerlike extensions and, resp., of the textile cutouts or textile recesses between the fingerlike extensions, different geometries of the inflated airbag may be produced. For example, in the inflated state the airbag may exhibit a shell-shaped, cap-shaped or C-shaped contour.

The fingerlike extensions may be connected to each other by stitching, for example. In general, the fingerlike extensions are preferred to be directly connected so that the fingerlike extensions are directly adjacent each other. By unraveling the connection the manufacturing state of the airbag becomes visible. In this manufacturing state it is preferably provided that the fingerlike extensions of the sheath are spaced apart from each other at least in portions. In other words, between the individual fingers a textile cutout is preferably provided. Said textile cutout may be formed by removing textile material. When manufacturing the airbag, the individual fingers are tightened and directly connected to each other, thus causing the sheath to arch or curve, resp., or to generally adopt a three-dimensional geometry. This becomes evident especially in the inflated state of the airbag. In other words, it is also provided in the invention that the three-dimensional shape of the inflated airbag is defined by the connection of the fingers of the sheath.

Preferably the fingerlike extensions are connected, especially stitched, glued or welded, to each other over their entire length. The fingerlike extensions form compartments of the closed gas expansion chamber, wherein the individual compartments are delimited by the connecting lines between the fingerlike extensions, especially the seams between the fingerlike extensions interconnecting the extensions. By the connection of the fingerlike extensions over their entire length on the one hand an improved stability of the airbag is obtained and, on the other hand, gaps which might impair the protection of a person are prevented from forming in the airbag.

The flexible sheath of the airbag according to the invention may be manufactured in different ways. On the one hand, the sheath may be configured in one piece, especially woven in one piece. In this respect, the sheath may be free from seams. This may be achieved, for example, by weaving the sheath in the OPW ("one piece woven") technique. Alternatively, the sheath may be designed to be configured by at least two textile cuts which are tightly connected, especially stitched, glued or welded, at their edges for forming the closed gas expansion chamber. The textile cuts preferably comprise two or more continuation tabs forming the fingerlike extensions by the connection at their edges. Manufacture of the airbag by two textile cuts that are connected at their edges is possible in an especially simple manner and allows a complicated geometry and, resp., outer contour of the sheath. For the sake of better readability, within the scope of the present application both the (flat) continuation tabs of the textile cuts later forming the fingerlike extensions of the sheath and the fingerlike extensions of the sheath providing a gas expansion chamber in the form of compartments will be referred to as fingerlike extensions' of the sheath and, resp., of the textile cut.

It is preferred when the textile cuts are identically shaped, especially as regards their geometry. In this way the textile cuts may be flatly superimposed and interconnected at their edges so as to form the flexible, preferably at least temporarily gas-tight sheath.

Generally it may be provided that the sheath includes an at least temporarily gas-tight material. The sheath substantially may include a material which retains gas within the gas expansion chamber at least for a predetermined period of time. The period of time has to be dimensioned so that in the case of impact efficient protection of a person is ensured. After the airbag and, resp., the sheath have absorbed the impact energy, loss of gas, for example by diffusion, through the sheath material is acceptable. However, at least temporarily, i.e. over the predetermined period of time, the material of the sheath is preferably gas-tight.

In an advantageous configuration of the present invention the sheath is designed to be configured in a point-symmetrical or axially symmetrical manner in a flat manufacturing state. In other words, the textile cuts used for forming the sheath may have a point-symmetric or axially symmetric outer contour. In a point-symmetric geometry the fingerlike extensions of the sheath and, resp., the continuation tabs of the textile cuts are oriented radially relative to a center of the sheath or extend preferably radially outwardly starting from a center of the sheath. In an axially symmetric geometry the individual fingerlike extensions may point away laterally from a central axis of the sheath, wherein on both sides of the central axis complementary or congruent fingerlike extensions are provided. This results in a uniform three-dimensional shape of the inflated airbag, which is desired in a lot of applications.

The sheath thus may adopt a saucer-type or groove-type contour in the inflated state. In both cases the sheath may have an upper part or upper side and a lower part or lower side, each of the upper part and the lower part being concavely or convexly curved. Especially each of the upper part and the lower part may be curved in the same direction.

In preferred embodiments the sheath may in general have an upper side and a lower side, the upper side adopting a larger area than the lower side in the inflated state of the sheath. This occurs especially when the upper side and the lower side are similarly curved. Due to the three-dimensional shape of the airbag a larger area is required for the upper side than for the lower side.

Further, in preferred embodiments the sheath in the inflated state may be designed to be pre-curved so that a lower side of the sheath at least partially surrounds a clearance, wherein the sheath can be deformed for absorbing impact energy while reducing the clearance. On the whole, the entire airbag thus may take a three-dimensional shape which is shown by a pre-curvature of the entire sheath. In this way, in the area of the lower side of the airbag and, resp., of the sheath a clearance is formed so that the sheath is arranged to be at least partially spaced apart from components inside a vehicle, for example. Therefore, when a person hits the airbag, the impact energy is absorbed not only by displacement of the gas disposed inside the airbag but also by a deformation of the sheath, with the clearance being reduced in the area of the lower side. In this way, the three-dimensional shape of the sheath contributes to the stability of the airbag, as by the absorption of impact energy by way of deformation of the sheath the seams of the airbag are subjected to a lower load.

In general, in the invention the shape of the airbag in the inflated state may be provided to be defined exclusively by the geometric configuration and connection of the fingerlike extensions. In this respect, the sheath and, resp., the airbag may be designed to be free from tethers. It is also possible that the sheath is free from curved seams or other elements which define the shape of the airbag in the inflated state.

According to an independent aspect, the invention is based on the idea to state an airbag module comprising an afore-described airbag and an inflator connected to the airbag. The inflator may be arranged especially in a central gas distributing area of the sheath from which the fingerlike extensions extend. It is ensured in this way that the gas generated in the inflator is distributed quickly and evenly via the fingerlike extensions and, resp., the compartments formed by the fingerlike extensions. Hence a uniform expansion of the airbag is resulting, which is desired in most fields of application.

Another independent aspect of the invention relates to a vehicle occupant restraint system comprising an afore-described airbag or the afore-described airbag module. A vehicle occupant restraint system of this type may be integrated, for example, in automotive vehicles, preferably multi-track vehicles such as cars or trucks.

The airbag described here is suited for different fields of application. In particular, a vehicle may be equipped with such airbag, wherein the airbag may be integrated in different vehicle parts. For example, a steering wheel may be provided for a vehicle comprising such airbag or airbag module, with the airbag being designed and/or dimensioned so that in the inflated state the airbag rests on a steering wheel rim of the steering wheel. The steering wheel rim in this respect constitutes a counter-bearing and supports the airbag so that the latter is adapted to absorb impact energy by gas displacement.

A similar principle is pursued in an instrument panel for a vehicle comprising an airbag or airbag module of this type, with the airbag being designed and/or dimensioned so that in the inflated state the airbag rests on a tray area and/or a glovebox cover of the instrument panel. In other words, the airbag may take a curved or arched three-dimensional shape such that the lower side of the airbag contacts the instrument panel.

Furthermore, a rear seat or a rear seat bench for a vehicle comprising such airbag or airbag module of the afore-described type has to be mentioned, with the airbag being designed and/or dimensioned so that in the inflated state the airbag extends between two seat cushions in the longitudinal vehicle direction. In this application the airbag substantially constitutes an interaction bag for preventing the crash of two persons having taken a seat on the rear seat or the rear seat bench.

Moreover, a window frame or a roof liner for a vehicle may include an airbag or an airbag module of this type, the airbag being designed and/or dimensioned so that in the inflated state the airbag spans over a side window of the vehicle. Such 'window bag' protects a person from crashing into the side window and thus reduces the risk of harm. Accordingly, in a preferred configuration the airbag may be designed to be spaced apart from the side window in the inflated state at least in portions so that a clearance is formed between the side window and the airbag. The airbag may especially be curved toward the interior of the vehicle in the inflated state. This applies in particular to the lower side facing the side window. In this way a clearance which decreases while the airbag deforms is formed between the side window and the airbag. In the case of impact the impact energy thus is absorbed not only by displacing the gas volume inside the airbag but also by deforming the airbag, wherein the clearance between the side window and the airbag is reduced.

In this context, it is referred to the fact that by the three-dimensional shape of the airbag the airbag volume and the gas expansion chamber in total may be configured to be smaller than in the case of conventional airbags, for by the three-dimensional shape the airbag substantially only represents the outer shell of a conventional airbag and absorbs the impact energy not only by gas displacement but also by airbag deformation. It is also possible in this way to make use of smaller inflators, which is also accompanied by advantageous weight saving.

In this respect, the airbag according to the invention is also suited for being integrated in garments. A piece of garment, especially a collar for being arranged around a person's neck, comprising such airbag or airbag module may excel by the fact that the airbag is designed and/or dimensioned so that in the inflated state the airbag encloses the person's head in a helmet-like manner. In this way, for example a helmet substitute, e.g. for bicycle riders or motorcyclists, may be created, with the helmet or the airbag forming only in the case of imminent crash.

BRIEF DESCRIPTION OF THE DRAWINGS

Hereinafter the invention will be illustrated in detail by way of embodiments with reference to the enclosed schematic drawings in which.

DESCRIPTION

Figure 1:
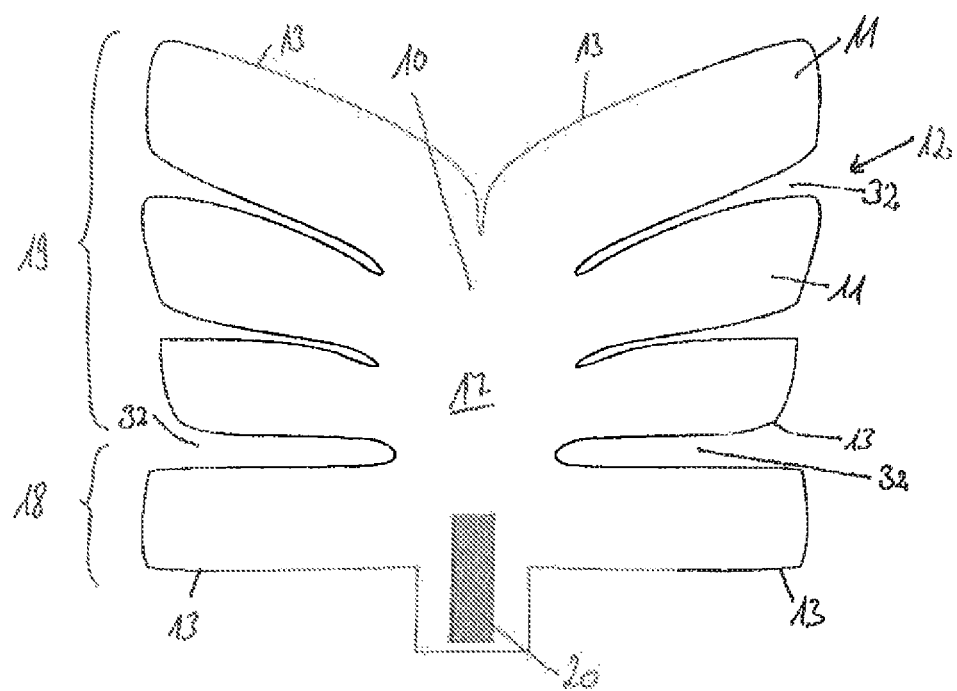
FIG. 1 shows a textile cut for a sheath of an airbag according to the invention in accordance with a preferred embodiment, the airbag being a head airbag.

Each of the enclosed Figures illustrates an inflatable airbag 1 serving for protection of a person especially in road traffic. The airbag 1 may be, on the one hand, a portable airbag 1 which is integrated in a person's clothing, for example, or may be an airbag 1 fixedly integrated in a vehicle.

In general, it is applicable to all embodiments that the airbag comprises a flexible sheath 10, wherein the flexible sheath 10 comprises plural fingerlike extensions 11. The fingerlike extensions 11 are separated from each other by textile cutouts 32 in a manufacturing state of the flexible sheath 10. In the manufacturing process the spaced fingerlike extensions 11 are interconnected so as to close the textile cutouts 32 or the gaps between the fingerlike extensions 11. The connection may be established by gluing, stitching or other connecting techniques. The fingerlike extensions 11 form directly adjacent compartments which are part of the gas expansion chamber of the sheath 10. The sheath 10 encloses said gas expansion chamber which fills with gas upon activation of the airbag and, resp., an inflator 20 connected to the airbag 1.

Since the fingerlike extensions 11 are initially arranged to be spaced apart from each other and do not contact each other before they are brought together and connected, a three-dimensional shape of the airbag 1 is resulting. The three-dimensional shape may manifest itself in a curvature of the airbag 1, for example. However, also other shapes are equally possible. The three-dimensional shape has to be generally differentiated from the conventional three-dimensional configuration of inflated airbags which expand starting from one point substantially evenly in all directions. Cushion-shaped airbags 1, for example, do not exhibit a three-dimensional shape in accordance with the present invention. In the case of three-dimensionally shaped bags 1 at least parts of the airbag or portions of the airbag expand in different directions and in so far form a three-dimensional contour. In particular, a three-dimensional shape of the airbag 1 may functionally manifest itself in that impact energy acting on the airbag 1 manifests itself not only by gas displacement but especially also by deformation of the entire airbag. For example, the airbag 1 may be pre-curved in arc shape in the direction of a person to be protected so that part of the impact energy is not dissipated by gas displacement inside the airbag 1 but also by "bending back" the entire airbag 1.

In general, the sheath 10 of the airbag 1 may be formed of two textile cuts 12 which are preferably identically shaped. The textile cuts 12 include continuation tabs later forming the fingerlike extensions 11. The textile cuts 12 are flatly superimposed and connected, especially stitched, to each other at their outer edges 13. Hence the textile cutouts 32 between the fingerlike extensions 11 are delimited by the seams at the outer edge 13. After that two opposed seams are combined so as to close the gap forming the textile cutout 32. The fingerlike extensions 11 are stitched to each other along the outer edge seams so as to achieve that the sheath 10 and, resp., the airbag 1 adopt the three-dimensional shape in the inflated state.

FIG. 1 illustrates a textile cut 12 for a sheath 10 of an airbag 1. The textile cut 12 substantially has a palm-type structure, wherein plural fingerlike extensions 11 extend in axial symmetry from a central area 17 of the sheath 10. The central area 17 substantially forms a central gas distribution area of the sheath 10. An inflator 20 is in fluid communication with the latter so that gas generated in the inflator 20 can be properly distributed to all fingerlike extensions 11.

The textile cut 12 according to FIG. 1 substantially comprises two portions. In an area close to the inflator the sheath 10 comprises a neck portion 18 to which a head portion 19 is connected. The neck portion 18 comprises two fingerlike extensions 11 which extend substantially perpendicularly starting from a central axis of the sheath 10. The head portion 19 comprises a total of six fingerlike extensions 11, wherein two fingerlike extensions 11 at a time form a pair arranged in axial symmetry to the central axis of the sheath 10. The fingerlike extensions 11 in the head portion 19 are arranged at an angle with the central axis, especially in palm shape.

Figure 2:
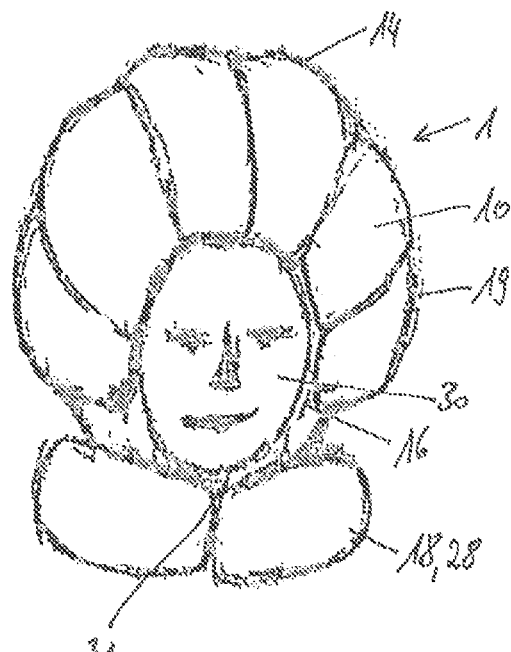
FIG. 2 shows the airbag comprising the textile cut according to FIG. 1 in the inflated state.

FIG. 2 illustrates an airbag 1 formed of textile cuts 12 according to FIG. 1. The airbag 1 is shown in the inflated state at the head 30 of a person. It is visible that the neck portion 19 forms a collar 28 which folds around the neck 31 of the person to be protected. The head portion 18 forms a helmet-type contour by enclosing the head 30 of the person. In this respect, the airbag 1 according to FIG. 2 shows a three-dimensional shape resulting from the contour of the fingerlike extensions 11 and the textile cutouts 32.

Figure 3:
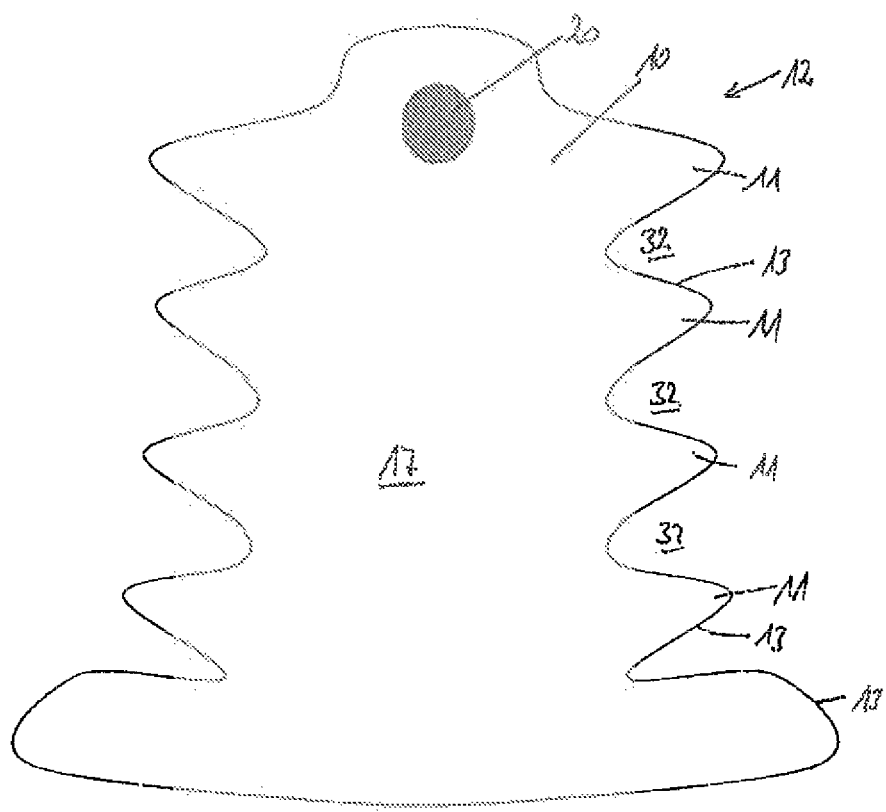
FIG. 3 shows a textile cut of a sheath of an airbag according to a further preferred embodiment, with the airbag being a passenger airbag.
Figure 4:
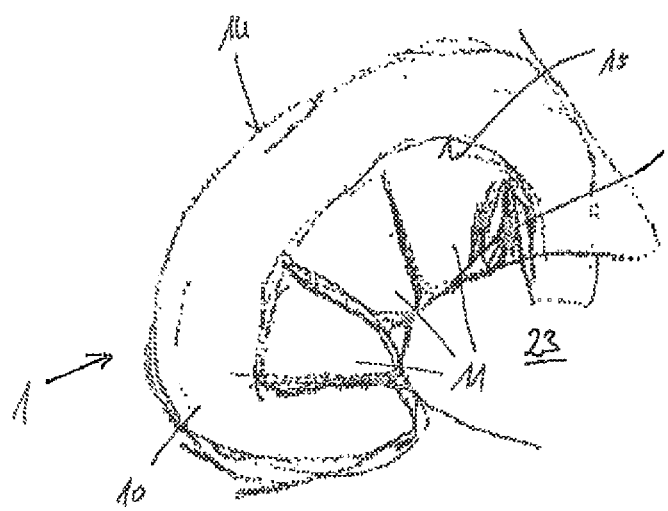
FIG. 4 shows the airbag comprising the textile cut according to FIG. 3 in the inflated state.

The connection between the shape of the fingerilke extensions 11 and the three-dimensional shape of the airbag 1 in the inflated state is clearly visible also from the embodiment according to FIGS. 3 and 4. FIG. 3 illustrates a textile cut 12 provided for forming the airbag 1 according to FIG. 4. The textile cut 12 comprises plural lateral fingerlike extensions 11 which are arranged to be spaced apart from each other by relatively wide textile cutouts 32. In this respect, the textile cut 12 substantially includes a toothed outer edge profile, wherein the toothed outer edge profile is formed in axial symmetry vie the central axis of the sheath 10. In a central area 17 of the sheath 10 the inflator 20 is arranged.

As is clearly evident from FIG. 4, the contour of the fingerlike extensions 11 in the textile cut 12 causes the airbag 1 in which the fingerlike extensions 11 are interconnected along their outer edges 13 to form a C-shaped cross-sectional contour in the inflated state, in this case the airbag 1 serves as passenger airbag and bulges over the curved contour of an instrument panel 23. An upper side 14 facing the person to be protected has a convex curvature which is likewise shown at a lower side 15. Hence both of the upper side 14 and the lower side 15 are convexly curved and thus form a three-dimensional shape of the airbag 1. The airbag 1 according to FIG. 4 in so far has a substantially shell-type or hemispherical shape and rests on the instrument panel 23.

Figure 5:
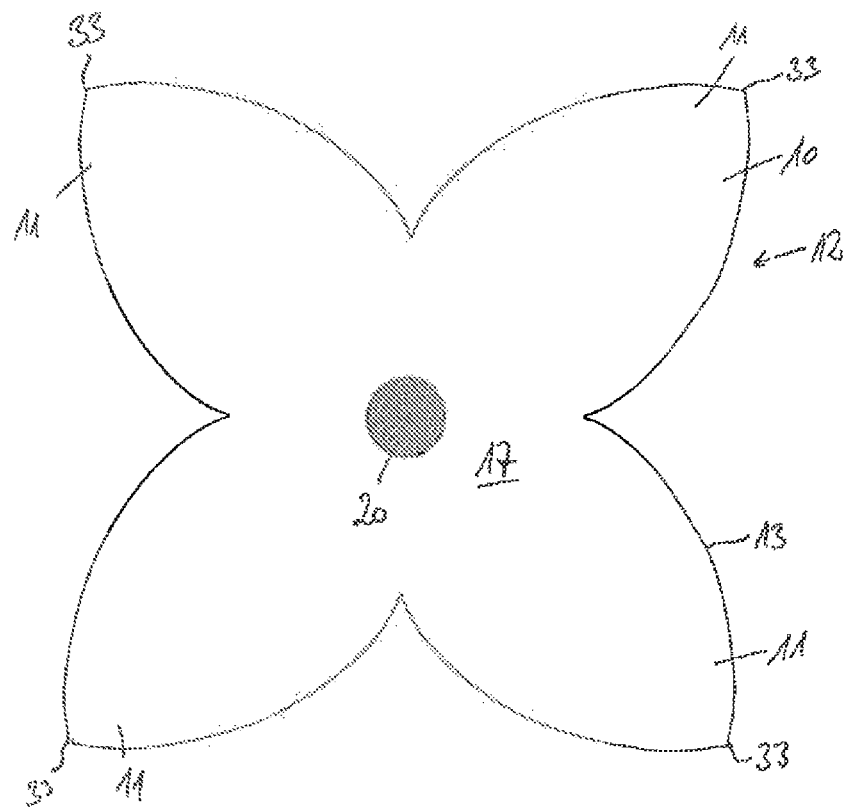
FIG. 5 shows a textile cut of a sheath of an airbag according to another preferred embodiment, the airbag being a driver airbag.
Figure 6:
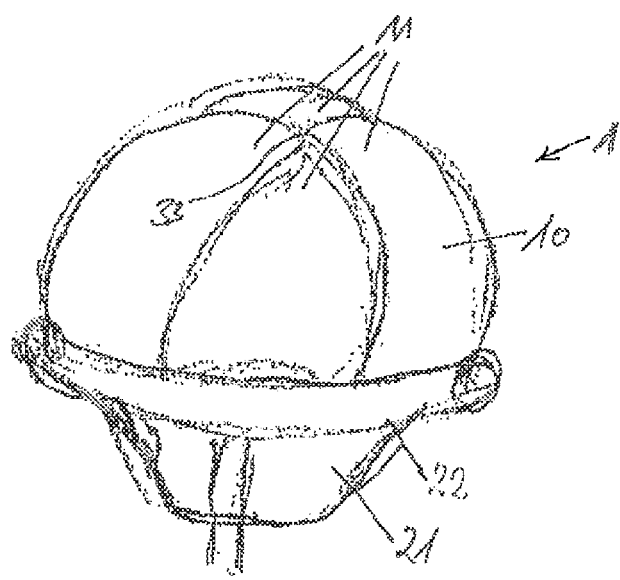
FIG. 6 shows the airbag comprising the textile cut according to FIG. 5 in the inflated state.

In FIGS. 5 and 6, a textile cut 12 and an airbag 1 formed therefrom are visible, wherein the airbag 1 is preferably used as driver airbag. For this purpose, in the inflated state the airbag 1 has a substantially hemispherical structure. The hemispherical structure or outer contour is obtained by the fact that the textile cut 12 comprises a total of four fingerlike extensions 11 radially extending from a center of the cavity 10. The fingerlike extensions 11 substantially have the shape of spherical shell segments. In particular the fingerlike extensions 11 include curved outer edges 13 so that, when joining the outer edges 13, the fingerlike extensions 11 are urged into a spherical or hemispherical shape. The inflator is disposed in the center of the sheath 10, namely in the central area 17. Each of the fingerlike extensions 11 ends in a tip 32. By stitching or generally connecting the fingerlike extension 11 to each other over their entire length the tips 33 meet in a central point and close the hemispherical outer contour of the airbag 1. FIG. 5 illustrates the airbag 1 in the inflated state, wherein it is clearly evident that the spherical shell segments or fingerlike extensions 11 are tightly interconnected so that the airbag 1 takes the three-dimensional shape of a hemisphere. The airbag 1 is preferably integrated in a steering wheel 21 and inflates upon activation ahead of the steering wheel rim 22. The cross-sectional diameter of the airbag 1 is dimensioned so that in the inflated state the airbag 1 rests on the steering wheel rim 22.

Another possible application for an airbag including a sheath 10 having plural fingerlike extensions 11 constitutes the protection of vehicle occupants against further vehicle occupants. In the case of side impact there is a risk of two persons positioned on the rear seat bench 26 mutually harming each other. Therefore an airbag 1 may be integrated in the rear seat bench 26 and span between two seat cushions of the rear seat bench 26 such that the airbag separates the seat cushions and, resp., the persons seated on the seat cushions from each other.

Figure 7:
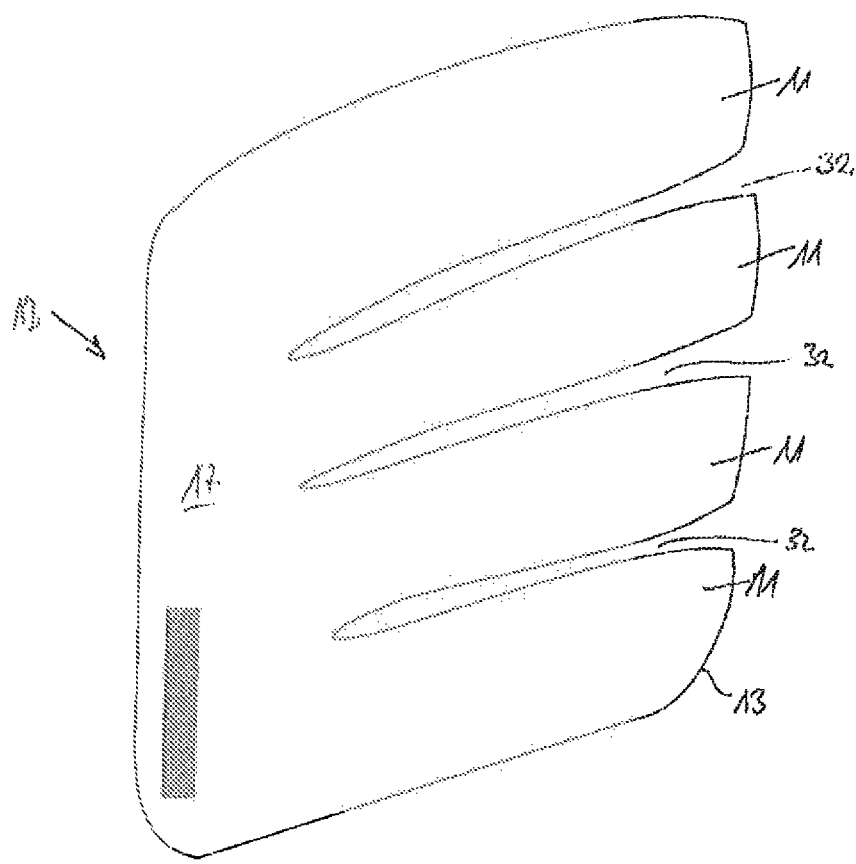
FIG. 7 shows a textile cut of a sheath of an airbag according to another preferred embodiment, the airbag being an interactive bag.
Figure 8:
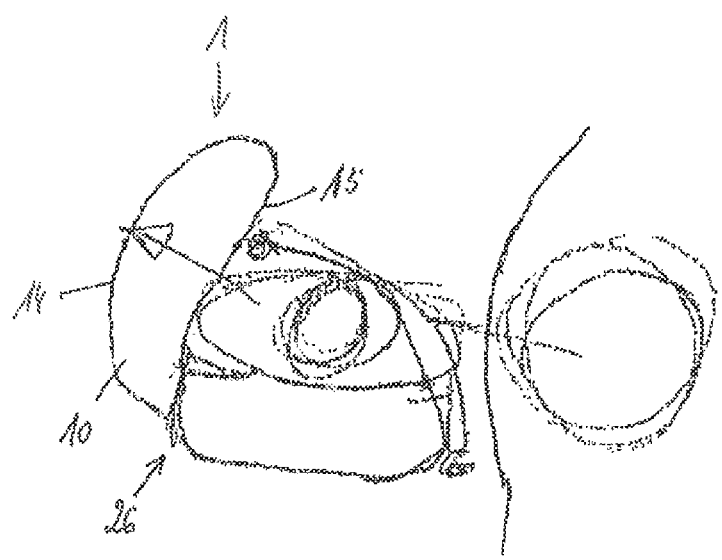
FIG. 8 shows the airbag comprising the textile cut according to FIG. 7 in the inflated state.

Such airbag 1 is shown in FIGS. 7 and 8. FIG. 7 illustrates a textile cut 12 suited for forming the airbag 1. The textile cut 12 includes plural fingerlike extensions 11 which extend from a central area 17 substantially in parallel to each other. Between the fingerlike extensions 11 textile cutouts 32 ensuring a distance between the fingerlike extensions 11 are arranged. The inflator 20 is positioned in the central area 17. In the completed condition of the sheath 10 and, resp., of the airbag 1 the fingerlike extensions 11 are interconnected so that the textile cutouts 32 are closed. In this way the airbag 1 takes a three-dimensional shape which manifests itself in a curvature of the lower side 15 of the airbag 1 in the inflated state. This is evident from FIG. 8. It is especially visible that the airbag 1 comprises an upper side 14 and a lower side 15, wherein both the upper side 14 and the lower side 15 shows a curvature orientated in the same direction. The airbag 1 preferably is disposed in a backrest of the rear seat bench 26 and upon release spans between the seat cushions of the rear seat bench 26 so as to prevent two persons seated on the rear seat bench 26 from dashing.

Figure 9:
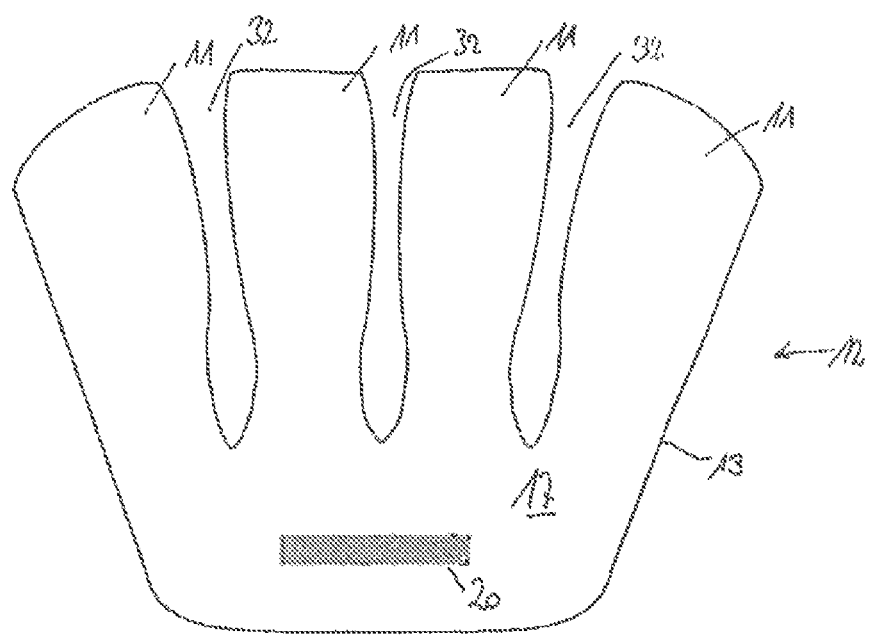
FIG. 9 shows a textile cut of a sheath of an airbag according to another preferred embodiment, the airbag being a knee airbag.
Figure 10:
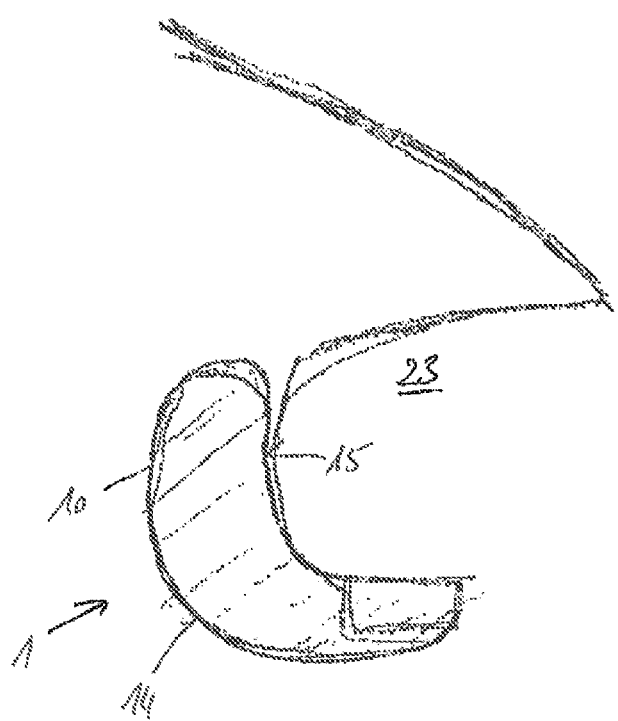
FIG. 10 shows the airbag comprising the textile cut according to FIG. 9 in the inflated state.

In FIGS. 9 and 10 a textile cut 12 and an airbag 1 including said textile cut 12 are illustrated, the airbag being preferably used for protecting the knees of a vehicle occupant. Such airbag 1 is preferably arranged beneath an instrument panel 23 and is intended to extend from the bottom over the front side of the instrument panel 23. In this way the lower extremities of a vehicle occupant are prevented from crashing into the instrument panel 23. The airbag 1 is formed of textile cuts 12 having a contour according to FIG. 9. The textile cut 12 especially comprises a central area 17 and fingerlike extensions 11 extending therefrom. The fingerlike extensions 11 are oriented preferably in the same direction and are formed on one side at the textile cut 12 and spaced apart from each other by textile cutouts 32. The outer contour of the textile cut 12 substantially reminds of a trapezoidal shape having two converging side lines. The textile cutouts 32 are drop-shaped at least in portions. The inflator 20 is arranged in the central area 17. In the completed state in which the fingerlike extensions 11 are directly interconnected, the sheath 10 has a substantially curved three-dimensional shape. The curved three-dimensional shape adapts to the shape and, resp., the outer contour of the instrument panel 23, as is clearly visible in FIG. 10. In particular, the completed airbag 1 includes an upper side 14 facing the vehicle occupants. A lower side 15 is facing the instrument panel 23 and adapts to the contour of the instrument panel 23.

Another preferred application of airbags 1 for vehicle occupant restraint systems are so called window bags. Upon release they span over the side windows 27 of a vehicle 2 so as to prevent occupants from crashing into the side windows 27. Such window airbag is exemplified in FIG. 12. Preferably a textile cut 12 having the outer contour illustrated in FIG. 11 serves for manufacturing the airbag 1 according to FIG. 12. The textile cut 12 substantially exhibits a wing-type contour with plural fingerlike extensions 11 extending on one side from a central area 17. The central area 17 spans the entire width of the textile cut 12. The fingerlike extensions 11 extend from the central area 17 in the same direction. The fingerlike extensions 11 extend to be substantially inclined or angled relative to the central area 17, wherein one half of the fingerlike extensions 11 is arranged at a positive angle and the other half is arranged at a negative angle with a central axis of the sheath 10. The central axis of the sheath 10 in FIG. 11 extends substantially perpendicularly in the plane of projection. With respect to this central axis, the textile cut 11 is designed to be axially symmetrical.

Figure 11:
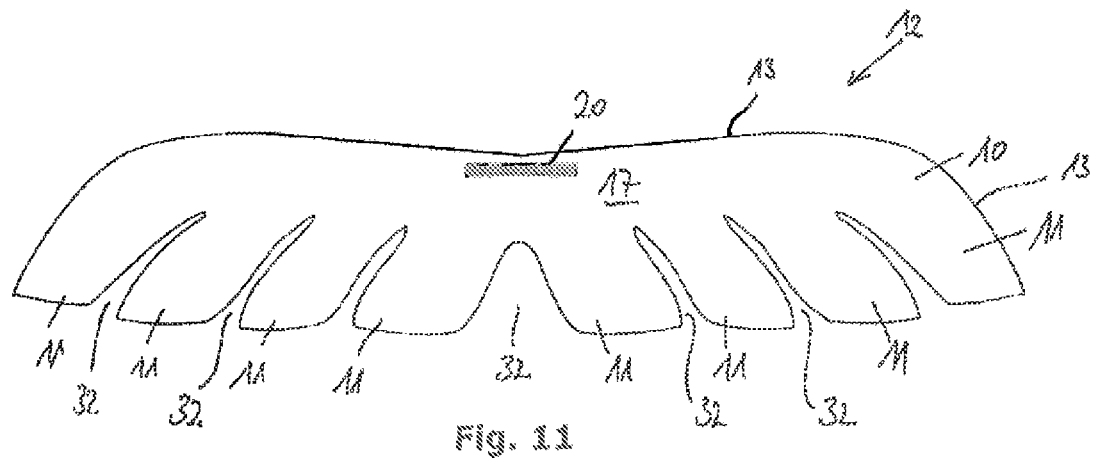
FIG. 11 shows a textile cut of a sheath of an airbag according to another preferred embodiment, the airbag being a window airbag.
Figure 12:
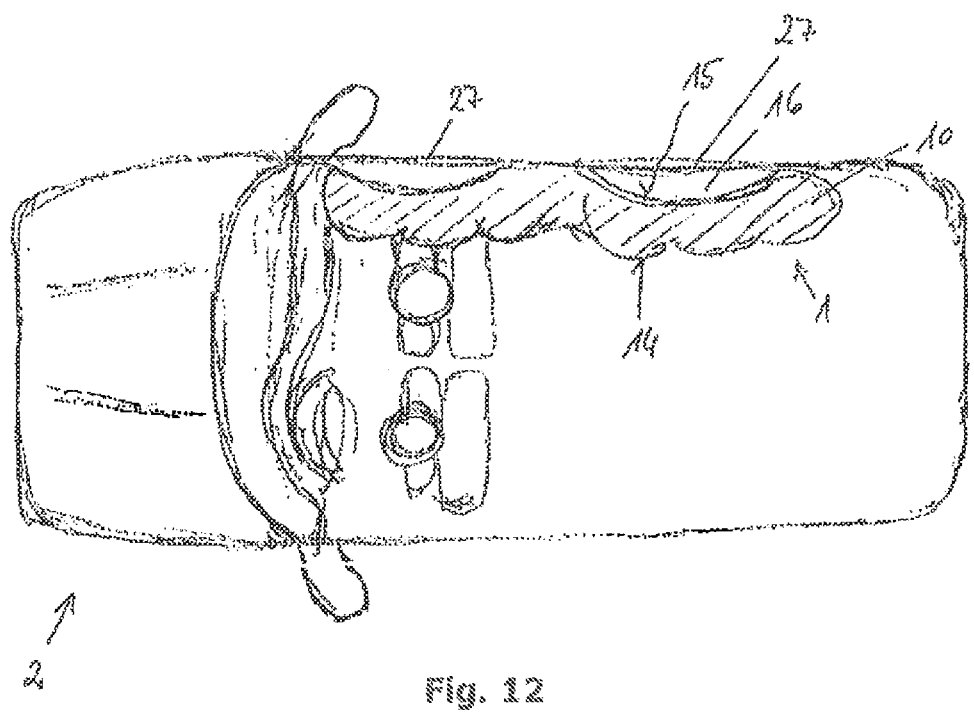
FIG. 12 shows an airbag comprising the textile cut according to FIG. 11 in the inflated state.

In the state of the airbag 1 shown in FIG. 12 the individual fingerlike extensions 11 are connected, especially stitched directly to each other. The textile cutouts 32 then are no longer visible. Rather, the airbag 1 and, resp., the sheath 10 is urged into a three-dimensional shape. The latter becomes visible at least when the airbag is provided in an inflated state. The three-dimensional shape of the airbag 1 according to FIGS. 11 and 12 presents itself in that the airbag 1 has a curvature which keeps the airbag 1, upon activation in a vehicle 2, spaced apart from a side window 27 at least in portions. FIG. 12 which shows a top view onto the interior of the vehicle 2 illustrates that the airbag is spanned at a distance from the side window 27 at least in portions. For this purpose, the airbag 1 has an upper side 14 facing the vehicle interior and a lower side 15 facing the side window 27. The lower side 15 forms a curvature keeping the sheath of the airbag 1 at a distance from the side window 27. In this respect, between the side windows 27 and the lower side 15 a clearance 16 is formed which may be additionally used for absorbing impact energy. When a person hits the upper side 14 of the airbag 1 and, resp., of the sheath 10, the airbag is not only deformed in itself, wherein gas is displaced inside the airbag 1. Rather, the airbag 1 is displaced on the whole so that the clearance 16 decreases and the lower side 15 of the sheath 10 is finally adjacent to the side window. Thus impact energy is absorbed already by such deformation of the airbag 1. As compared to conventional airbags 1, especially window bags, a gas volume which in FIG. 12 is replaced by the clearance 16 can be saved. In total, therefore a smaller gas expansion chamber is required to achieve the same effect as in the case of conventional airbags. This permits using inflators 20 which are smaller and thus lighter.

Within the scope of the present application moreover a manufacturing method, especially for manufacturing the airbag described herein is disclosed. The method comprises the features listed hereinafter:

1. A method of manufacturing an airbag 1, the method comprising the following steps of:
   providing at least two textile cuts 12 having fingerlike extensions 11, wherein textile cutouts 32 are arranged between the fingerlike extensions 11 so that the fingerlike extensions 11 are spaced apart from each other at least in portions;
   flatly superimposing the textile cuts 12 and connecting, especially stitching and/or gluing, the edges of the textile cuts 12 for forming a sheath 10 of the airbag 1;
   closing the textile cutouts 32 and connecting, especially stitching and/or gluing, neighboring fingerlike extensions 11 to each other for forming a three-dimensionally shaped sheath 10.
2. The method according to embodiment 1, wherein the textile cuts 12 are identically shaped.
3. The method according to embodiment 1 or 2, wherein the textile cuts 12 have an at least temporarily gas-tight material.
4. The method according to any one of the preceding embodiments, wherein the textile cutouts 32 are substantially V-shaped.
5. The method according to any one of the preceding embodiments, wherein the fingerlike extensions 11 extend star-shaped from a center or at an angle, especially at right angles from a central axis of the textile cuts 12.
6. The method according to any one of the preceding embodiments, wherein the fingerlike extensions 11 include curved or profiled side edges delimiting the textile cutouts 32.

LIST OF REFERENCE NUMERALS 1 airbag
2 vehicle
10 sheath
11 fingerlike extension
12 textile cut
13 outer edge
14 upper side
15 lower side
16 clearance
17 central area
18 neck portion
19 head portion
20 inflator
21 steering wheel
22 steering wheel rim
23 instrument panel
26 rear seat bench
27 side window
28 collar
30 head
31 neck
32 textile cutout
33 tip

The invention claimed is:

1. An inflatable airbag (1) for the protection of a person comprising:
   a flexible sheath (10) including a central area (17) from which at least two fingerlike extensions (11) extend with the central area (17) being integrally formed as one piece with the at least two fingerlike extensions (11),
   wherein the flexible sheath (10) delimits a closed gas expansion chamber by the fingerlike extensions (11), wherein the fingerlike extensions (11) are connected to each other so that in an inflated state the airbag (1) takes a three-dimensional shape and the fingerlike extensions (11) deploy along a curved trajectory, wherein the fingerlike extensions (11) are spaced apart from each other at least in portions by a cutout (32) in a manufacturing state of the sheath (10) such that connecting the fingerlike extensions (11) to each other over their entire length closes the cutout (32) in the inflated state.

2. The airbag (1) according to claim 1, wherein the sheath (10) is woven in one piece.

3. The airbag (1) according to claim 1, wherein the sheath (10) is formed by at least two textile cuts (12) which are tightly connected to each other at their edges (13) for forming the closed gas expansion chamber.

4. The airbag (1) according to claim 3, wherein the textile cuts (12) are identically shaped.

5. The airbag (1) according to claim 1, wherein the sheath (10) includes an at least temporarily gas-tight material.

6. The airbag (1) according to claim 1, wherein the sheath (10) is designed to be point-symmetrical or axially symmetrical in a flat manufacturing state.

7. The airbag (1) according to any claim 1, wherein the sheath (10) includes an upper side (14) and a lower side (15), wherein in the inflated state of the sheath (10) the upper side (14) covers a larger area than the lower side (15).

8. The airbag (1) according to claim 1, wherein the sheath (10) is pre-curved in the inflated state so that a lower side (15) of the sheath (10) at least partially surrounds a clearance (16), wherein the sheath (10) is deformable for absorbing impact energy while decreasing the clearance (16).

9. The airbag (1) according to claim 1, wherein the sheath (10) is designed to be free from tethers.

10. An airbag module comprising an airbag (1) according to claim 1 and an inflator (20) connected to the airbag (1).

11. The airbag module according to claim 10, wherein the inflator (20) is disposed in a central gas distributing area of the sheath (10) from which the fingerlike extensions (11) extend.

12. A vehicle occupant restraint system comprising an airbag (1) or an airbag module according to claim 1.

13. A steering wheel (21) for a vehicle comprising an airbag (1) or an airbag module according to claim 1, wherein the airbag (1) is designed and/or dimensioned so that in the inflated state the airbag (1) rests on a steering wheel rim (22) of the steering wheel (21).

14. An instrument panel (23) for a vehicle comprising an airbag (1) or an airbag module according to claim 1, wherein the airbag (1) is designed and/or dimensioned so that in the inflated state the airbag (1) rests on a tray area (24) and/or a glovebox cover (25) of the instrument panel.

15. A rear seat or rear seat bench (26) for a vehicle comprising an airbag (1) or an airbag module according to claim 1, wherein the airbag (1) is designed and/or dimensioned so that in the inflated state the airbag (1) extends between two seat cushions in the longitudinal vehicle direction.

16. A window frame or a roof liner for a vehicle comprising an airbag (1) or an airbag module according to claim 1, wherein the airbag (1) is designed and/or dimensioned so that in the inflated state the airbag (1) spans over a side window (27) of the vehicle.

17. The window frame or roof liner according to claim 16, wherein in the inflated state the airbag (1) is spaced apart from the side window (27) at least in portions and curved toward the interior of the vehicle so that a clearance (16) is formed between the side window (27) and the airbag (1).

18. The airbag according to claim 1, wherein the airbag has a C-shaped cross-section in the inflated state.

19. The airbag (1) according to claim 1, wherein inflation gas contacts and expands the fingerlike extensions (11) into the inflated state.

20. A garment comprising a collar (28) for being arranged around a neck (31) of a person, comprising:
an airbag (1) comprising a flexible sheath (10) including at least two fingerlike extensions (11), wherein the flexible sheath (10) delimits a closed gas expansion chamber by the fingerlike extensions (11), wherein the fingerlike extensions (11) are connected to each other over their entire length so that in an inflated state the airbag (1) takes a three-dimensional shape, and in that the sheath (10) in the inflated state takes a dished or groove-type contour, wherein the airbag (1) is designed and/or dimensioned so that in the inflated state the airbag (1) encloses the head (30) of the person in a helmet-like manner.

21. The garment according to claim 20, wherein inflation gas contacts and expands the fingerlike extensions (11) into the inflated state.

22. An inflatable airbag for the protection of a person comprising:
a flexible sheath formed by a pair of textile cuts each including a central area and a plurality of fingerlike extensions extending from the central area and formed integrally as one piece with the central area, the fingerlike extensions being separated by a cutout in a flat manufacturing state and being sewn together over their entire length such that each cutout is closed when the airbag is in the inflated state so as to deploy along a curved trajectory such that the airbag is hemispherical in an inflated state.

23. The airbag (1) according to claim 22, wherein inflation gas contacts and expands the fingerlike extensions (11) into the inflated state.

\* \* \* \* \*